United States Patent Office 3,236,805
Patented Feb. 22, 1966

3,236,805
POLYPROPYLENE STABILIZED WITH THIO-
ESTERS OF LONG-CHAIN ALKYL COM-
POUNDS AND PROCESS FOR PREPARING
SAME
Cornelio Caldo, Terni, Italy, assignor to Montecatini
Società Generale per l'Industria Mineraria e Chimica,
a corporation of Italy
No Drawing. Filed July 31, 1961, Ser. No. 127,987
Claims priority, application Italy, Aug. 1, 1960,
13,569/60
5 Claims. (Cl. 260—45.85)

The present invention relates to a new class of thioesters of the general formula $$R-\underset{\underset{O}{\|}}{C}-O-CH_2-CH_2-S-CH_2-CH_2-O-X \quad (I)$$

wherein R is an aliphatic radical that is either linear or branched and X is a hydrogen atom or the group $$-\underset{\underset{O}{\|}}{C}-R$$

wherein R is as previously defined, and to a novel method of synthesis for obtaining such thioesters.

The thioester products of the general Formula I show a remarkable stabilizing action against deterioration caused by heat, aging and light of polyolefins or compositions of polyolefins and compounds containing basic nitrogen such as those formed from polypropylene and polyalkyleneimine disclosed in U.S. patent application, Serial No. 702,430, filed on December 12, 1957, now U.S. Patent 3,107,228.

It is known that certain esters of thiodipropionic acid, e.g., lauryl thiodipropionate, may be used for the stabilization of polyolefins.

Surprisingly, it has now been found that isomers of such esters, i.e., compounds of the general Formula I, even though such isomers have chemical and physical properties which are different from those of such esters, exert an improved stabilizing action for polyolefins.

Preferably, the R radical of Formula I is an aliphatic chain containing from about 8 to 30 carbon atoms.

The novel process of this invention is characterized by the fact that an aliphatic acid of the type RCOOH, wherein R has the above mentioned meaning, is reacted with thiodiethylenglycol. Esterification occurs according to the following equations:

(a) $2RCOOH + S(CH_2-CH_2-OH)_2 \longrightarrow$
$R-O\underset{\underset{O}{\|}}{C}-O-(CH_2)_2-S-(CH_2)_2-O-C-R + 2H_2O$ (b) $RCOOH + S(CH_2-CH_2-OH)_2 \longrightarrow$
$R-\underset{\underset{O}{\|}}{C}-O-(CH_2)_2-S-(CH_2)_2-OH + H_2O$ As appears from Equations a and b, when the reactants are used in equimolar amounts then X in the general Formula I is a hydrogen atom (Equation b), whereas when two moles of the aliphatic acid are esterified by one mole of the thioethylenglycol the X of the general formula is a $$-\underset{\underset{O}{\|}}{C}-R$$

group in which R is as previously defined (Equation a).

In the event that X in the general Formula I is the group $$-\underset{\underset{O}{\|}}{C}-R$$

such compounds may also be obtained by reacting two moles of a salt of an aliphatic acid of the type R—COOMe wherein Me is a metal, preferably silver, with one mole of dichloroethyl sulphide according to the equation:

(c) $2RCOOMe + S(CH_2-CH_2-Cl)_2 \longrightarrow$
$R\underset{\underset{O}{\|}}{C}-O-(CH_2)_2-S-(CH_2)_2-O\underset{\underset{O}{\|}}{C}R + 2MeCl$ Compounds of the general Formula I which have shown a particularly desirable stabilizing action on polyolefins are those in which R is a undecyl or heptadecyl radical.

Both the esterification reaction and the condensation by dichloroethylsulphide are desirably carried out in the presence of solvents (although the use of a solvent is not essential). Particularly suitable solvents include benzene, toluene, xylenes (o, m, and p) which solvents permit azeotropic removal of the reaction water.

If desired, the esterification reaction may be carried out in the presence of an acid which acts as accelerator for the esterification. A particularly suitable acid is p-toluenesulfonic acid.

At the end of the esterification the solvent may be removed by evaporation or steam distillation and the mono- or dithioester obtained may be discharged from the reaction vessel as a molten product or may be extracted with solvents and then crystallized.

Table I shows the positions of the adsorption bands and their approximate intensity.

TABLE I.—POSITIONS AND APPROXIMATE INTENSITIES
(ZONE 5–15µ) λ IN µ

| Lauryl thiodipropionate | Didodecoyl-thiodiglycolate | Dioctadecoylthioglycolate | Lauryl thiodipropionate | Didodecoyl-thiodiglycolate |
|---|---|---|---|---|
| 5.75 ff | 5.75 ff | 5.76 ff | 8.54 ff | 8.49 f |
|  |  | (6.80 fl) | (8.63 fl) | (8.60 fl) |
| 6.82 ff | 6.83 ff | 6.84 ff | (8.72 fl) |  |
|  |  | 6.91 dd |  |  |
| 7.02 d | 7.02 d | (6.98 fl) |  | (8.95 fl) |
|  |  | 7.08 m | 9.07 m | 9.08 f |
| 7.16 d | 7.20 d | 7.20 d |  | 9.22 d |
| (7.26 fl) | 7.25 d | 7.26 d | 9.40 m | 9.46 d |
|  |  | (7.33 fl) | 9.68 dd | (9.68 fl) |
| 7.39 ff | (7.40 fl) |  | 9.85 m | 9.82 dd |
|  | 7.53 d | 7.52 dd |  | (10.00 fl) |
| (7.60 fl) |  | 7.61 d | 10.05 dd | 10.07 m |
|  | 7.69 m |  | 10.16 m | 10.18 d |
| 7.78 dd |  | 7.74 d | 10.36 m | 10.31 m |
|  | 7.87 m | 7.86 d | 10.49 m |  |
| 7.94 m |  | 7.97 d | 10.70 m |  |
| 8.07 ff | 8.06 m | 8.10 d |  | 10.85 m |
|  | 8.28 m | 8.25 m | 11.23 d | 11.27 m |
|  |  | 8.39 m |  |  |
| (8.46 fl) |  |  |  | 11.49 m |

(fl)=inflection; ff=very strong; f=strong; m=average; d=weak; dd=very weak.

TABLE II.—POSITIONS AND APPROXIMATE INTENSITIES
(ZONE 5–15µ) λ IN µ

| Dioctadecoyl-thiodiglycolate | Lauryl thiodipropionate | Didodecoylthiodiglycolate | Dioctadecoylthiodiglycolate |
|---|---|---|---|
| 8.50 m |  |  | 11.89 dd |
| 8.67 dd | 12.44 | 12.20 d | 12.36 m |
|  | 12.75 f | (12.75 fl) | 12.78 m |
| 8.85 dd |  | 12.86 m |  |
| (8.95 fl) | 13.05 m |  |  |
| 9.07 dd |  |  | 13.18 m |
|  |  | 13.35 d |  |
| 9.46 ff | (13.45 fl) |  | (13.46 fl) |
|  |  | (13.60 fl) | (13.60 fl) |
| (9.81 fl) | 13.73 m | 13.71 f | 13.71 ff |
| 9.94 d | 13.89 f | 13.98 f | 13.91 ff |
|  |  |  | (14.03 fl) |
| 10.19 m |  | 14.36 m | 14.40 m |
| 10.34 m | 14.48 d |  |  |
| 10.50 dd | 14.86 d |  |  |
| 11.29 |  |  |  |
| 11.41 d |  |  |  |

(fl)=inflection; ff=very strong; f=strong; m=average; d=weak; dd=very weak.

The infrared spectra of the three products is completely different in the spectrum zone between 5 and 15μ (Table I) and particularly in the finger-print zone (about 8 to 15μ).

The ν vibration (C-O) of lauryl thiodipropionate is at 8.45μ, whereas this ν vibration is shifted up to 8.49μ for didodecoylthiodiglycolate and up to 8.5μ for dioctadecoylthiodiglycolate, with a consequent remarkable decrease in intensity.

The weak band which is present at 14.87μ for laurylthiopropionate and at 1479μ for thiodipropionic acid, and which is attributable to the valence vibration of the C-S-C bond, is shifted up to 14.37μ for didodecoylthiodiglycolate and up to 14.40μ for dioctadecoylthiodiglycolate.

Further, at 13.71–13.90μ the characteristic doublet is present, due to the rocking vibration of the $CH_2$ groups of the —$(CH_2)_{10}$— (didodecoylthiodiglycolate)

—$(CH_2)_{16}$—

(dioctadecoylthiodiglycolate), —$(CH_2)_{11}$— (laurylthiodipropionate) chains.

In this latter product (laurylthiodipropionate) the splitting is much less intense than in the first two products.

Compounds of general Formula I show a remarkable stabilizing action against deterioration by heat, aging and light when incorporated in olefin crystalline polymers in an amount from about 0.02 to 2% by weight of the polyolefin and preferably about 0.2%.

Further, such compounds act as stabilizers for compositions comprising polyolefins and polymers of monomeric units containing nitrogen which compositions yield textile fibers having improved dyeing properties.

The addition of compounds of the general Formula I to polyolefins according to the present invention is generally carried out by mixing the stabilizer compounds with the polyolefins.

However, it is also possible to mix the compounds by other methods, as for instance by mixing of the polyolefins with a solution of the stabilizer in a suitable solvent followed by evaporation of the solvent; or by the addition of the stabilizer to the polyolefins at the end of the polymerization; etc.

Further, it is possible to obtain the stabilizing action by applying the stabilizing compounds to the manufactured polyolefin article, for instance by dipping the article in a solution or dispersion of the stabilizer and then evaporating the solvent or dispersing media.

The various compounds of the general Formula I have a good compatibility with polyolefins in the molten state and do not cause any spotting or staining of polyolefins.

Compositions stabilized according to the present invention are particularly suitable for preparing mono- and multi-filaments, staple, dyeing yarn, bulk yarn, films, ribbons and shaped articles.

The addition of an inorganic salt of stearic acid, e.g., calcium stearate, which salt functions as an antacid, to the stabilized compositions before spinning improves the stability characteristics of these compositions.

The following examples are given to further illustrate the invention.

*Example 1*

800 ml. toluene, 400 g. lauric acid (2 moles), and 122.19 g. (1 mole) thiodiethylene glycol are introduced in a 2 liter flask. The mixture is heated under reflux in a Markusson apparatus, so that the water formed in the reaction is removed, whereby there is a total conversion of the acid and of the thioalcohol into the thioester. After removal of 9 ml. water, 0.5 g. p-toluene sulfonic acid are added. Heating is continued until 36 ml. water (2 moles) have been removed. (This occurs over about a 30 hour period.) A great part of the toluene is distilled off under normal pressure, and then the remainder is distilled off under reduced pressure (residual pressure 20–30 mm. Hg). (The toluene may also be removed by steam distillation and the thioester may be recovered by filtration.)

The didodecoylthiodigylcolate thus formed (470 g.) is crystallized from methanol in the form of white crystals having a melting point of 53° C.

Analysis of the crystals gives the following results: Calculated for $C_{28}H_{54}O_4S$: C=69.5%; H=11.1%; S=6.6%. Found for $C_{28}H_{54}O_4S$: C=69%; H=10.88%; S=6.5%.

The molecular weight determined by the ebullioscopic method from benzene was 482, whilst the theoretical molecular weight is 486.

Didodecoylthiodiglycolate is insoluble in water, even hot water; it is very soluble in ether, chloroform, and ethyl acetate, whether these solvents are at room temperature or at higher temperatures; it is soluble in ethyl alcohol, methyl alcohol, acetone, benzene, toluene, heptane and carbon tetrachloride.

When boiled for 1 hour in an aqueous solution of sodium hydroxide, didodecoylthiodiglycolate is split into thiodiglycol and lauric acid, which confirms the structure of the dithioester.

*Example 2*

800 ml. toluene, 568 g. stearic acid (2 moles), and 122.19 g. (1 mole) thiodiethyleneglycol are introduced in a 2 liter flask. The mixture is heated under reflux in a Markusson apparatus which permits removal of the water formed in the reaction so that the equilibrium of the reaction is shifted towards the complete conversion of the acid and of the thioalcohol in thioester. After removal of 9 ml. water, 0.5 g. p-toluene sulfonic acid are added. The heating is continued for about 30 hours until 36 ml. water (2 moles) have been removed. A great amount of the toluene is distilled off under normal pressure and then the remaining toluene is distilled off under reduced pressure (residual pressure, 20–30 mm. Hg). The dioctadecoylthiodiglycolate thus formed (637 g.) is crystallized in methanol in the form of white crystals having a melting point of 79° C.

Analysis gives the following results: Calculated for $C_{40}H_{78}O_4S$: C=73.5%; H=11.9%; S=4.90%. Found for $C_{40}H_{78}O_4S$: C=73.39%; H=11.78%; S=4.89%.

The molecular weight calculated by the ebullioscopic method from benzene was 651, whilst the theoretical molecular weight is 654.

Dioctadecoylthioglycolate is insoluble in water and ether both at room and elevated temperatures; it is very soluble in benzene, toluene, chloroform, and carbon tetrachloride whether these solvents are at room or elevated temperatures; it is soluble in ethyl alcohol, acetone, heptane, and ethyl acetate when these solvents are at elevated temperatures; it dissolves only partially in hot methyl alcohol.

*Example 3*

800 ml. toluene, 200 g. lauric acid (1 mole), and 122.19 g. (1 mole) thiodiethyleneglycol are introduced in a 2 liter flask. The mixture is heated under reflux in a Markusson apparatus which allows the removal of the water formed in the reaction, so that equilibrium of the reaction is shifted towards the complete conversion of the acid and of the alcohol to the monothioester. After removal of 9 ml. water, 0.5 g. p-toluene sulfonic acid are added. The heating is continued for about 20 hours until 18 ml. water (1 mole) have been removed. A great amount of toluene is distilled off under normal pressure, and then the remainder is distilled off under reduced pressure (residual pressure 20–30 mm. Hg). The dodecoylthiodiglycolate thus formed (301 g.) is crystallized from methanol in the form of white crystals having a melting point of 38.5° C.

Analysis gives the following results: Calculated for $C_{18}H_{32}O_3S$: C=71%; H=10.5%; S=10.5%. Found for $C_{18}H_{32}O_3S$: C=70.7%; H=10.45%; S=10.39%.

The molecular weight determined by the ebullioscopic method from benzene was 305, whilst the theoretical molecular weight is 304. Dodecoylthiodiglycolate is insoluble in water; it is slightly soluble in ether and heptane; it is soluble in ethyl alcohol, methyl alcohol, acetone, benzene, toluene and carbon tetrachloride; it is also very soluble in chloroform and ethyl acetate.

*Example 4*

800 ml. toluene, 284 g. stearic acid (1 mole), and 122.19 g. (1 mole) thiodiethyleneglycol are introduced in a 2 liter flask. The mixture is heated under reflux in a Markusson apparatus, which allows the removal of the water that is formed so that the equilibrium of the reaction is shifted towards the complete conversion of the acid and of the thioalcohol into the monothioester. After removal of 9 ml. water, 0.5 g. p-toluene sulfonic acid are added. Heating is continued for about 20 hours until 18 ml. of water have been removed. A portion of the toluene is distilled off under normal pressure and then the remainder is distilled off under reduced pressure (residual pressure 20–30 mm. Hg). The octadecoylthiodiglycolate thus formed (378 g.) is crystallized from methanol in the form of white crystals which melt at 71° C.

Analysis gives the following results: Calculated for $C_{22}H_{44}O_3S$: C=68%; H=11.4%; S=8.23%. Found for $C_{22}H_{44}O_3S$: C=67.91%; H=11.42%; S=8.21%.

The molecular weight calculated by the ebullioscopic method from benzene was 385.5, whilst the theoretical molecular weight is 388.

Octadecoylthiodiglycolate is insoluble in water; it is soluble in ethyl alcohol, methyl alcohol, ether, acetone, benzene, toluene, heptane and carbon tetrachloride; it is very soluble in chloroform and ethyl acetate.

*Example 5*

Hot solutions of 50 g. silver nitrate in 100 ml. water and 59 g. lauric acid in 200 ml. of 1.45 N-potassium hydroxide are added simultaneously to 100 ml. hot water with stirring. The addition is controlled so that approximately equivalent amounts of the reactants are present at all times. The precipitated silver salt is collected on a filter, washed with water and acetone, and air dried. This material is powdered and then dried in a vacuum at 60° C. over phosphorous pentoxide. 85 g. of silver dodecanoate (silver laurate) are obtained, with a yield of 94%. 61.38 g. (0.2 mole) silver dodecanoate are introduced into a 500 ml. flask, 200 ml. ethyl alcohol are added, and then 15.9 g. (0.1 mole) dichloroethyl sulfide, obtained from reaction between ethylene and sulfur, are added. The mixture is heated at its boiling temperature and the reaction is continued for ten hours, under a hood in order to avoid the dangerous action of the dichloroethyl sulfide, which must be handled very prudently. The alcohol is removed by distillation under atmospheric pressure and the crude product is poured in the fused state into a capsule. The didodecoylthiodiglycolate thus formed (52.7 g.) is crystallized from methanol and is in the form of white crystals having a melting point of 53° C.

Subsequent Examples 6 to 10 illustrate the stabilizing action of various compounds of general Formula I.

*Example 6*

A homogeneous mixture consisting of 9.98 kg. polypropylene prepared by using stereospecific catalysts (having an intrinsic viscosity [η] of 1.34 when measured in tetrahydronaphthalene at 135° C., a residue after heptane extraction of 93.4%, and an ash content of 0.028%) and 20 g. didodecoylthiodiglycolate is introduced at room temperature into a Werner mixer. The polymer-stabilizer mix undergoes melting in a glass tube, in a bath kept at 250° C. for 10 minutes, to produce a nearly colorless molten product.

The mixture is spun by means of a melt spinning device under the following conditions:

| | |
|---|---|
| Screw feeder temperature | 220° C. |
| Extrusion head temperature | 220° C. |
| Spinneret temperature | 220° C. |
| Type of the spinneret | 60/0, 8.16 mm. |
| Maximum pressure | 55 kg./cm.² |
| Winding rate | 230 meters/minute. |

The yarn is drawn with a drawing ratio of 1:5 at 120° C.

The serimetrical characteristics of the yarn thus obtained are the following:

| | |
|---|---|
| Tenacity | g./den__ 4.9 |
| Elongation | Percent__ 21 |

In the conversion from polymer to yarn, the intrinsic viscosity [η] of the stabilized yarn diminishes to 79% of its initial value, whereas the [η] of the filament obtained from a non-stabilized polymer control diminishes to 73.5% of its initial value.

While an unstabilized yarn would become brittle when exposed for 15 hours to the action of heat (120° C.) in an oven provided with air circulation (thermal accelerated aging test) the stabilized yarn remains virtually unaltered in its characteristics.

When the stabilized yarn undergoes the exposure to ultra violet rays of a mercury-vapor lamp, its tenacity decreases to 38% of the initial value, whereas the tenacity of the non-stabilized yarn is reduced to 32% of its initial value.

*Example 7*

In a Werner mixer at normal temperature a homogeneous mixture is prepared consisting of 9.95 kg. polypropylene prepared in the presence of stereospecific catalysts (having an intrinsic viscosity [η] of 1.34 as measured in tetrahydronaphthalene at 135° C., a residue after heptane extraction of 93.4% and an ash content of 0.028%) and 50 g. didodecoylthiodiglycolate.

The polymer-stabilizer mix is melted in a glass tube maintained in a bath kept for 10 minutes at constant temperature of 250° C. to give a nearly colorless molten product. The mixture is spun in a melt spinning device under the following conditions:

| | |
|---|---|
| Screw feeder temperature | 215° C. |
| Extrusion head temperature | 215° C. |
| Spinneret temperature | 215° C. |
| Type of the spinneret | 60/0, 8.16 mm. |
| Maximum pressure | 60 kg./cm.² |
| Winding rate | 450 meters/minute. |

The yarn is drawn with a drawing ratio of 1:5 at 130° C. The serimetrical characteristics of the yarn thus obtained are the following:

| | |
|---|---|
| Tenacity | g./den__ 4.61 |
| Elongation | Percent__ 23.5 |

In the conversion of the stabilized polymer to yarn, the intrinsic viscosity [η] of the yarn decreases to 81% of its initial value, whereas the [η] of non-stabilized yarn control decreases to 73.5% of its initial value.

The stabilized yarn, when exposed for 15 hours to the action of the heat in an oven provided with air circulation at 120° C. (thermal accelerated aging test) remains virtually unaltered in its characteristics.

By exposure for 20 hours to ultra violet rays by means of a mercury-vapor lamp, the stabilized yarn shows a decrease in its tenacity to 41% of the initial value, whereas the unstabilized yarn control shows a decrease in its tenacity to 32% of the initial value.

*Example 8*

In a Werner mixer at room temperature, a homogeneous mixture is prepared consisting of 9.90 kg. polypropylene prepared in the presence of stereospecific catalysts (intrinsic viscosity [η]=1.34 as measured in tetrahydronaphthalene at 135° C., heptane extraction residue=93.4%, and ash content=0.028%) and 100 g. didodecoylthiodiglycolate.

The polymer-stabilizer mix undergoes melting in a glass tube, in a bath kept at a constant temperature of 250° C., for 10 minutes, to produce a nearly colorless molten product. The molten mixture is spun by means of a melt spinning device under the following conditions:

| | |
|---|---|
| Screw feeder temperature | 210° C. |
| Extrusion head temperature | 220° C. |
| Spinneret temperature | 210° C. |
| Type of the spinneret | 60/0, 18.16 mm. |
| Maximum pressure | 55 kg./cm.² |
| Winding rate | 220 meters/minute. |

The yarn is drawn with a drawing ratio of 1:5 at 120° C.

The serimetrical characteristics of the yarn thus obtained are the following:

| | |
|---|---|
| Tenacity | g./den__ 4.58 |
| Elongation | percent__ 24 |

In the conversion of the polymer to yarn, the intrinsic viscosity [η] of the yarn decreases to 83% of its initial value, whereas the [η] of the non-stabilized yarn control decrease to 73.5% of its initial value.

The stabilized yarn, when exposed for 15 hours to the action of heat in an oven provided with air circulation at 120° C. (thermal accelerated aging test) remains nearly unaltered in its characteristics.

By exposure for 20 hours to ultraviolet rays from a mercury-vapor lamp, the stabilized yarn shows a decrease in its tenacity to 45.5% of the initial value, whereas the unstabilized yarn shows a decrease in tenacity to 32% of the initial value.

Example 9

In a Werner mixer at room temperature a homogeneous mixture is prepared consisting of 9.95 kg. polypropylene prepared in the presence of stereospecific catalysts (intrinsic viscosity [η]=1.34 measured in tetrahydronaphthalene at 135° C.; residue after heptane extraction=93.4%; ash content=0.028%) and 50 g. of dioctadecoylthiodiglycolate.

The polymer-stabilizer mix undergoes melting in a glass tube, in a bath kept at constant temperature of 250° C., for 10 minutes, and gives a nearly colorless molten product.

The mixture is spun by means of a melt-spinning device under the following conditions.

| | |
|---|---|
| Screw feeder temperature | 220° C. |
| Extrusion head temperature | 220° C. |
| Spinneret temperature | 210° C. |
| Type of the spinneret | 60/0, 8.16 mm. |
| Maximum pressure | 45 kg./cm.² |
| Winding rate | 280 meters/minute. |

The yarn is drawn with a drawing ratio 1:5 at 130° C. The serimetrical characteristics of the yarn thus obtained are the following:

| | |
|---|---|
| Tenacity | g./den__ 4.7 |
| Elongation | percent__ 23 |

In the conversion from the polymer to yarn, the intrinsic viscosity [η] of the stabilized yarn decreases to 80.5% of its initial value, whilst the [η] of the non-stabilized yarn control decreases to 73.5% of its initial value.

The stabilized yarn, when exposed for 15 hours to the action of the heat in an oven provided with air circulation at 120° C. (thermal accelerated aging test) remains nearly unaltered in its characteristics.

By exposure for 20 hours to ultraviolet rays from a mercury-vapor lamp the stabilized yarn decreases in its tenacity to 43.2% of its initial value, whilst the non-stabilized yarn control decreases in its tenacity to 32% of its initial value.

Example 10

A film is prepared by extruding polypropylene obtained in the presence of stereospecific catalysts (having an intrinsic viscosity [η]=2.08, an ash content=0.13%, and a residue after heptane extraction=95.1%) and to which 0.3% didodecoylthiodiglycolate had been added.

The extrusion conditions are as follows:

| | |
|---|---|
| Screw feeder temperature | °C__ 230 |
| Extrusion head temperature | °C__ 265 |

The film is quenched on a cold roll at 250° C.
The film shows the following characteristics:

| | |
|---|---|
| Thickness | mircons__ 25 |
| Lateral tenacity | kg./mm.²__ 2.65 |
| Longitudinal tenacity | kg./mm.²__ 3.9 |
| Lateral elongation | percent__ 635 |
| Longitudinal elongation | percent__ 555 |

Upon formation of the manufactured film product the intrinsic viscosity [η] decreases to 89% of its initial value, whilst the [η] of a corresponding non-stabilized film decreases to 75% of its initial value.

Exposure of the film for 15 hours to the action of heat in an oven provided with air circulation at 130° C. (thermal accelerated aging test) does not cause the film to be appreciably altered in its characteristics.

Variations can, of course, be made without departing from the spirit of this invention.

Having thus described this invention, what is claimed is:

1. A composition stabilized against the action of heat, light, and aging, this composition comprising polypropylene and from about 0.02 to 2 percent by weight based on said polypropylene of a thioester of the general formula

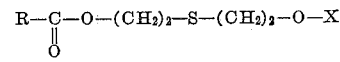

wherein R is an alkyl having from 8 to 30 carbon atoms and X is selected from the group consisting of hydrogen and the radical

2. The composition of claim 1 in filamentary form.
3. The composition of claim 1 in film form.
4. A process for obtaining thioesters of the general formula

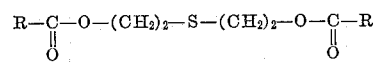

wherein R is an alkyl containing from 8 to 30 carbon atoms, comprising reacting two moles of a salt of an aliphatic acid of the formula R—COOMe, wherein Me is a metal, are reacted with one mole of dichloroethylsulphide.

5. The composition of claim 1 wherein R is the undecyl radical or the heptadecyl radical.

References Cited by the Examiner

UNITED STATES PATENTS

| | | | |
|---|---|---|---|
| 2,451,895 | 10/1948 | White et al. | 260—488 |
| 2,585,448 | 2/1952 | Emerson et al. | 260—30.8 |
| 2,603,604 | 7/1952 | Ballard et al. | 260—488 |

LEON J. BERCOVITZ, *Primary Examiner.*

ALPHONSO D. SULLIVAN, *Examiner.*